United States Patent Office 3,551,560
Patented Dec. 29, 1970

3,551,560
PROCESS OF RECONSTRUCTING TENDONS, CARTILAGE, NERVE SHEATHS, AND PRODUCTS
Heinrich F. Thiele, 23 Kiel, Germany
No Drawing. Filed Oct. 2, 1967, Ser. No. 671,981
Int. Cl. A61k 27/00, 17/00
U.S. Cl. 424—95                                     9 Claims

ABSTRACT OF THE DISCLOSURE

Tendons, cartilage tissue, nerve sheaths and the like materials which are useful in surgery for replacing damaged tissue of this type and for implantation into the body, are obtained by first preparing a colloidal solution of animal or human tendons, cartilage tissue, nerve sheaths, and the like by exposing such material to the action of a swelling agent which is capable of splitting up hydrogen and sulfur bridges but does not cause denaturation of the proteins, removing the mucopolysaccharides therefrom either before or during swelling, and reconstituting the tendon, cartilage, or nerve sheath from said colloidal solution by allowing ions to diffuse into the colloidal solution preferably after addition of the mucopolysaccharide or a polyuronic acid compound, such as an alginate to the sol. The resulting gel consists of oriented filamentary molecules and is similar in its composition and structure to natural human or animal tendon, cartilage, nerve sheath material. It is well tolerated and readily accepted by the human and animal body.

Examples of swelling agents are salts such as sodium chloride or salts with hydrotropic activity such as lithium rhodanide, zinc chloride, acids such as phosphoric acid, formic acid, lactic acid, urea, organic amines, and especially alkali metal hydroxides, preferably lithium hydroxide and sodium hydroxide.

Examples of gelling ions are ions of copper, cadmium, calcium, aluminum, lanthanum and other polyvalent metals. Hydrogen ions are also useful.

The strength properties and stability of the resulting gels can be improved by a treatment with cross-linking agents.

BACKGROUND OF THE INVENTION

The present invention relates to a process of regenerating and reconstructing connective tissue material and more particularly the supporting and connecting structures of the human and animal body such as tendons, ligaments, and cartilage, for instance, forming the cartilage layers between the bones binding them firmly together, nerve sheaths and the like, said reconstructed materials being similar in their structure and composition to natural connective tissue, such as tendons, ligaments, cartilage, nerve sheaths, and the like, and to products obtained by said process.

Heretofore nerve injuries in which the nerve was completely severed were surgically treated by carefully stitching the severed nerve with the ends touching one another. Difficulties arose, however, when the ends of the damaged nerve were so shortened that they could not be brought together to meet. In such cases a portion of a sensory nerve or of a nerve from an animal was sometimes inserted and carefully stitched between the separated ends. Likewise torn tendons were stitched together. But these operations were not always successful and postoperative complications and irreparable damage were frequently the final result.

No attempts have heretofore been made to replace, for instance, the extended or protruding intravertebral disks. Such defects were treated heretofore by surgically removing and concurrent fusion of the involved spinal segments.

SUMMARY OF THE INVENTION

It is one object of the present invention to provide a new and valuable cartilage material which corresponds in its composition and structure to natural human or animal cartilage and which is well tolerated and readily accepted by the human and animal body.

Another object of the present invention is to provide a new and valuable tendon material which corresponds in its composition and structure to natural human or animal tendons and which is well tolerated and readily accepted by the human and animal body.

Still another object of the present invention is to provide a new and valuable nerve sheath material which corresponds in its composition and structure to natural human or animal nerve sheaths and which is well tolerated and readily accepted by the human or animal body.

A further object of the present invention is to provide a simple and highly effective process of producing such reconstructed cartilage, tendon, or nerve sheath material.

A further object of the present invention is to use such new and valuable reconstructed cartilage, tendon, or nerve sheath material in surgery for replacing diseased or injured cartilage, tendons, or nerve sheaths.

Other objects of the present invention and advantageous features thereof will become apparent as the description proceeds.

In principle the process of regenerating and reconstructing cartilage and tendons comprises the following steps:

(a) Human or animal cartilaginous tissue or tendons are exposed to solutions containing agents which are capable of splitting up hydrogen and sulfur bridges, such as urea and amines, alkaline agents, for instance, alkali metal hydroxides, preferably lithium hydroxide or sodium hydroxide, salts such as sodium chloride and salts with hydrotropic activity, for instance, lithium rhodanide, zinc chloride, acids, for instance, phosphoric acids, formic acid, or hydroxy carboxylic acids, for instance, lactic acid, or thio-compounds, for instance, dimethylsulfoxide, dimethylformamide, and others. Said dissolving agents may also be used in mixture with each other, or the respective tissue may be treated therewith successively, repeatedly, and/or alternately. Of course, only dissolving agents and solvents can be used which do not cause any substantial denaturation of the proteins. This treatment causes swelling of the tissue.

(b) The mucopolysaccharides present in the tissue are removed therefrom either in a separate extraction step or during swelling by using solvents which are capable of dissolving the same.

(c) The swollen tissue can then readily be separated mechanically into separate layers, if such are present, said layers corresponding to the histological specific structure of the natural starting material.

(d) Thereafter the swollen tissue, or the separated layers thereof, each by itself, are dispersed mechanically and dissolved in the same or other solvents to form a colloidal solution whereby care is taken that no substantial degradation of the chain of the filamentary molecules of the tendon or cartilage material takes place. Preferably such mechanical dispersion and dissolution is carried out at room temperature.

(e) Excess of the dissolving agent is removed from the resulting colloidal solution by decanting and dialysis or electrodialysis against water and entrained air bubbles are removed, for instance, by centrifuging or by exposing the sol to a vacuum.

(f) The mucopolysaccharides present in the tissue are removed therefrom either in a separate extraction step or during swelling by using solvents which are capable of dissolving the same.

(g) For reconstructing cartilage or tendons, the resulting colloidal solution containing the proteins of cartilage or tendons, or the solutions containing their separate layers, is converted into a gel by allowing gel-forming ions to diffuse thereinto. Thereby orientation of the gelled filamentary protein molecules takes place. Of course, care must be taken that the diffusing ions do not cause denaturation of the proteins. Preferably the initially removed mucopolysaccharides or, in their place, alginates or other substantially inert polyuronic acids are admixed to the colloidal solution before gel formation. The mucopolysaccharides or respectively, the polyuronic acids such as alginic acid and the like are admixed to the sol and dissolved therein in a predetermined amount as ascertained by preliminary tests. These preliminary tests are carried out with varying proportions of protein to mucopolysaccharide in order to determine the mucopolysaccharide addition required to achieve optimum results on reconstruction and regeneration of the tendon or cartilage. Elasticity and strength characteristic of the resulting gel which corresponds in its structure to the naural cartilage or tendons may be increased and improved by allowing the ions to diffuse periodically in so-called ion waves. Biological tanning may also be employed for this purpose.

The resulting gels of oriented filamentary molecules of the protein of tendon and cartilage tissue can be produced in any desired shape, for instance, in the form of balls, tubes, membranes, fibers, and the like. For this purpose correspondingly shaped molds wherein gel formation is effected, are employed. On causing the ions to diffuse into the sol while exposing the sol to additional directional forces, for instance, by mechanically causing the sol to flow and rotate, the filamentary molecules may be oriented in the form of spirals and in filaments which cross over each other. Thereby, spirals rotating in the same direction or contrarotating spirals may be formed. The spirals may also have different angles of inclination or pitch. The crossing over filaments may be arranged like the warp and woof in fabrics. As a result of such exposure to additional directional forces the stability of the gel can be considerably increased.

The electrolyte supplying the gel-forming ions may be a dilute organic acid such as lactic acid or citric acid. Metal salts may also be used for gel formation. The preferred metal ions are those of polyvalent metals such as copper, cadmium, calcium, aluminum, lanthanum, and others which are supplied in the form of their nitrates. Once the final structure of the gel is formed, the metal ions can be exchanged by hydrogen ions without any substantial change in the structure and orientation of the gel. Only very small ion concentrations, comparable to those of trace elements, are necessary for gel formation.

In the same manner as described hereinabove for cartilage and tendon tissue, it is possible to reconstruct nerve sheaths. For this purpose (a) The axons or nerve fibers are mechanically separated from the nerve sheath.

(b) The nerve sheath is then caused to swell in the same manner as described for cartilaginous tissue and tendons by exposure to solutions which contain agents which are capable of splitting up hydrogen and sulfur bridges, such as urea and amines, alkaline agents, for instance, alkali metal hydroxides, preferably lithium hydroxide or sodium hydroxide, salts such as sodium chloride and salts with hydrotropic activity, for instance, lithium rhodanide, zinc chloride, acids, for instance phosphoric acids, formic acid, or hydroxy carboxylic acids, for instance, lactic acid and especially such agents with lyotropic properties. Said dissolving agents may also be used in mixture with each other. Or the respective tissue may be treated therewith successively, repeatedly, and alternately.

(c) The mucopolysaccharides present in the tissue are removed therefrom either in a separate extraction step or during swelling by using solvents which are capable of dissolving the same.

(d) The swollen tissue is then dissolved by mechanically dispersing the same and dissolving it in the same solvent used for swelling or in another suitable solvent whereby care is taken that no substantial degradation of the chain of the filamentary molecules of the nerve sheath material takes place. Preferably such mechanical dispersion and dissolution is carried out at room temperature.

(e) Excess of the dissolving agent is removed from the resulting colloidal solution by decanting and dialysis or electrodialysis against water and entrained air bubbles are removed, for instance, by centrifuging or by exposing the sol to a vacuum.

(f) For reconstructing the nerve sheath the resulting colloidal solution containing the proteins thereof is converted into a gel by allowing gel-forming ions to diffuse thereinto. Thereby orientation of the gelled filamentary protein molecules takes place. Of course, care must be taken that the diffusing ions do not cause denaturation of the proteins. Preferably the initially removed mucopolysaccharides or, in their place, alginates or other substantially inert polyuronic acids are admixed to the colloidal solution before gel formation.

The mucopolysaccharides or, respectively, the polyuronic acids such as alginic acid and the like are admixed to the sol and dissolved therein in a predetermined amount as ascertained by preliminary tests. These preliminary tests are carried out with varying proportions of protein to mucopolysaccharides in order to determine the mucopolysaccharide addition required to achieve optimum results on reconstruction and regeneration of the nerve sheath.

The same electrolytes supplying the gel-forming ions are used as described hereinabove for reconstructing tendon and cartilage tissue and the procedure is also the same.

It is also possible to add to the sol used for reconstructing the tendon, cartilage, or nerve sheath material, lipids and therapeutic agents such as bacteriostatic and virostatic agents.

Furthermore, elasticity and strength characteristics of the resulting nerve sheath gels may also be increased and improved by allowing the ions to diffuse periodically in so-called ion waves.

If desired, the resulting gel may be cross-linked and rendered insoluble, for instance, by impregnating the gel with a suitable cross-linking agent, for instance an aldehyde, such as formaldehyde, an alkyl di-aldehyde such as glutar dialdehyde or 1-hydroxy adipic dialdehyde, a di-isocyanate, or the like compound.

The resulting gels of oriented filamentary molecules of the proteins of the nerve sheath can also be produced in any desired shape, for instance, in the form of balls, tubes, membranes, fibers, and the like.

Exposure of the sol during ion diffusion to additional directional forces also causes further increase in the mechanical strength properties and the stability of the gel. By suitably rotating the flowing sol and changing the axis of rotation there can be produced nerve sheaths with several layers arranged at different angles of the fibrillas.

DETAILED DESCRIPTION OF THE INVENTION

The following examples serve to illustrate the present invention without, however, limiting the same thereto.

Example 1

100 parts of tendons are separated from the Kangaroo tail, are mechanically freed of adhering tissue, and are cut to pieces and strips of a length of one cm. The mucopolysaccharides are removed therefrom by repeated extraction with 200 parts of 1% sodium chloride solution.

Thereafter, the extracted tissue is swollen by placing it first into 0.1 N sodium hydroxide solution and thereafter into 2 N sodium hydroxide solution. The tissue is removed from the latter solution repeatedly and, after each removal, is placed into a new portion thereof. The swollen tissue is then placed into an aqueous 50% urea solution and is subjected therein to the action of a homogenizer, thereby yielding a clear viscous sol of the tendon material. Excess solvent is removed by dialysis. The sol is centrifuged to eliminate entrained air.

For reconstructing the tendon material 10 parts of sodium alignate are admixed to and dissolved in the colloidal solution. The resulting clear, viscous symplex sol is poured as a thin coating over the surface of a porous mold of the desired shape and the mold is immersed into an aqueous N cupric nitrate solution. Diffusion of the cupric ions of said electrolyte solution through the porous mold causes formation of a thin membrane which is extended between two annular gaskets. Into this membrane there is introduced continuously and gradually the symplex sol while the mold is immersed in said electrolyte solution. Diffusion of the cupric ions through the mold, the porous membrane, and the gradually produced gel gradually builds up the gel whereby the tender fibrillas and bundles of fibrillas are oriented and form the desired anisotropic gel structure. The cupric ions are then exchanged against hydrogen ions by treating the mold with the resulting gel with a dilute acetic acid solution. Excess hydrogen ions are removed from the layers by dialysis or electrodialysis.

Example 2

A sol is prepared as described hereinabove from cattle cartilage. After addition of the alginate, a porous, tubular mold of the desired diameter is immersed into the sol. An aqeous solution of 0.1 N cadmium nitrate is introduced into the interior of the tubular mold which is rotated to facilitate diffusion. The cadmium ions diffuse through the porous walls of the tubular mold into the solution and cause precipitation of a gel membrane on the surface of the mold. As soon as the gel membrane has attained the required thickness, the tubular mold together with the gel adhering thereto is removed from the solution and the cadmium nitrate solution is replaced by an 0.1 N citric acid solution. By repeatedly changing the citric acid solution, the cadmium ions are exchanged against hydrogen ions. Excess hydrogen ions are removed from the layers by dialysis or electrodialysis. The resulting gel consists of a tubular cartilage body of oriented filamentary protein molecules.

Example 3

The procedure is the same as described in Example 2 whereby however, the tubular mold is provided with an outlet at its bottom and whereby the sol is passed through the interior of the rotating mold while the cadmium ions diffuse from the outside through the porous wall of the mold into the sol. By varying the speed and direction of flow of the sol in the mold and the speed and direction of rotation of the mold and by effecting these changes continuously are with interruptions it is possible to produce oriented cartilage gels of any desired structure.

Example 4

Hog tendons are converted into a sol as described in Example 1. The de-aerated sol, after addition of alginate, is forced through fine nozzles into an aqueous N cupric nitrate solution. Thereby fibers of reconstructed tendon material are produced. They are washed with distilled water and then immersed into a 40% formaldehyde solution for 24 hours. Thereafter the fibers are immersed into a solution of 100 parts by weight of 40% formaldehyde and 40 parts by weight of urea which has been buffered to a pH of 7.0 to 8.0 by the addition of 6 parts by weight of barium acetate. The barium ions replace the cupric ions by ion exchange. The thus treated fibers are heated to remove excess solution and to cause polycondensation to urea-formaldehyde resin which imparts increased stability and strength properties to the resulting tendon fibers.

Example 5

10 ccm. long pieces of fresh nerves are mechanically freed of their axon by stripping or peeling off the sheath. The remaining collected tubular sheaths are defatted by means of a mixture of methanol and methylol for up to two hours. The sheaths are treated with dilute hydrochloric acid to remove polyvalent cations and are swollen in an aqueous 0.1 N solution of lithium hydroxide. The swelling solution is repeatedly decanted and replaced by fresh solution. The swollen nerve sheaths are then dissolved in said lithium hydroxide solution by mechanical dispersion. The resulting solution is centrifuged to remove insoluble residue and to de-aerate the solution. Excess swelling agent is removed from the solution by dialysis in an oblique cylinder. Alginic acid is added thereto and dissolved therein in a proportion of one part of alginic acid to five parts of dry substance content of the nerve sheath solution and the solution is again de-aerated by centrifuging in a cooled centrifuge operating at 5000 revolutions per minute for 20 minutes. The resulting sol is placed into high cylindrical containers. Porous tubes are inserted into said cylinders and N cupric nitrate solution is filled into said porous tubes. Cupric ions diffuse through said porous tube into the nerve sheath solution and cause gel formation around said tubes. The diameter of the porous tubes is selected so that the resulting tubular ionotropic gel which corresponds in its structure to that of natural nerve sheaths and thus represents a reconstructed nerve sheath has, after shrinking, the required diameter to be surgically stitched to the nerve ends.

In place of the dissolving agents used in the preceding examples for preparing the colloidal tendon, cartilage, or nerve sheath solution, there may be used other such agents.

In place of alginic acid, there may be used other polyelectrolytes such as pectic acid, pectins, chondrus acid, i.e. the acid derived from carragheen or Irish moss, carboxy methyl cellulose, polyacrylic acid and polymethacrylic acid, guaran phosphoric acid, and the like as additives to form the ionotropic gels. Various mucopoly-saccharides derived from animal tissue such as hyaluronic acid, chondroitin sulfuric acids A and B, dermatan sulfuric acid, heparin, kerato sulfuric acids and others may be employed for this purpose although alginic acid has proved to be the preferred agent.

As stated above, swelling may also be effected with organic amines such as methylamine, dimethylamine, ethylene diamine, ethylamine, tetraethylene pentamine, and others which are preferably used after completely dehydrating the cartilage, tendons, or nerve sheath material.

The temperature at which swelling is effected is between about 23° C. and 27° C. and preferably at about 25° C. At lower temperatures swelling is considerably retarded while at higher temperatures solutions of low viscosity are obtained. Using alkali metal hydroxide solutions for swelling may cause degradation of the mucopolysaccharides which are very sensitive to alkaline agents.

The colloidal solution is obtained from the swollen material, for instance, by pressing it through the narrow gap formed by a piston which does not fit accurately a cylinder wherein the swollen material is placed. The resulting sol which is usually highly viscous and thixotropic is preferably diluted with water to twice its volume and is then dialyzed.

It may be pointed out that the proteins of tendons, cartilage, nerve sheaths and the like form with the mucopolysaccharides or uronic acids a so-called symplex compound. Said term "symplex" designates salts consisting of two colloidal components. It is such a symplex sol of protein and mucopolysaccharide that is oriented ionotropically on allowing ions to diffuse thereinto, thus causing orientation and partial dehydration of the filiform molecules and fixation of the latter to an ionotropic gel which has the desired macroscopic and microscopic properties and represents the organic matrix of the reconstituted tendons, cartilage, nerve sheaths, and the like. The symplex of a protein with a polycation such as alginic acid represents at a specific pH-value a colloidal-chemical unit. All the acid groups of the mucopolysaccharides or polyuronic acids, i.e. carboxyl or sulfonyl groups are bound by the protein. The symplex exhibits the behavior of a chemically unitary amphi-ion. From the colloidal-chemical viewpoint such as amphi-ion exhibits all the properties of a structurally viscous, lyophilic, filamentary or filiform molecule.

Optimum symplex sols contain predetermined amounts of protein and mucopolysaccharide or polyuronic acids. Usually a ratio of proteins to mucopolysaccharide between about 96:4 and 74:26 and preferably between about 95:5 and 85:15 depending on the mucplysaccharide or polyuronic acid used produces satisfactory gels on ion diffusion.

Orientation of the filamentary molecules by ion diffusion according to the present invention requires the selection of suitable compensating ions or "gegenions" which do not simply precipitate the filamentary molecules but which retain the oriented filamentary molecules at the same time in their gelled bond or association. Suitable salts are aluminum, chromium (III), nickel (II), lead (II), cadmium, copper (II), calcium salts, preferably their nitrates. In general, the gels produced with aluminum and chromium (III) ions are not very ductile and tend to crumble while those produced with calcium salts are relatively soft. The preferred ions are the cadmium and copper ions. Preferably 0.1 N to 0.5 N solutions of said salts are used whereby the dry substance content of the symplex sol is between about 0.3% to 1.0% and preferably between 0.5% and 0.75%.

It was found that the gels produced with metals of the transition series are gels with capillaries of a diameter of 0.5 mm. or less while those gels which are produced with aluminum and chromic ions usually do not possess such capillaries.

Gel formation may also be effected by a treatment with dilute mineral acids, such as 0.1 N hydrochloric acid. However, such a treatment has the disadvantage that the orientation of the filamentary molecules gradually decreases and that the gel slowly dissolves. Therefore, it is the preferred procedure either (a) to allow an acid to act on the sol while simultaneously cross-linking the filamentary molecules or
(b) to use acids the anions of which have a cross-linking effect.

Simultaneous treatment with an acid and a cross-linking agent is, for instance, achieved by using water-soluble cross-linking agents such as short-chain aldehydes, preferably formaldehyde, or $\alpha,\omega$-dialdehydes, such as glutar dialdehyde, 1-hydroxy adipic dialdehyde and the like compounds. For this purpose the sol is, for instance, covered by a layer of a mixture of 0.2 N hydrochloric acid and an 0.2% formaldehyde solution (1:1). The resulting gels are washed with water until excess formaldehyde is removed. The resulting gels show birefringence and are stable.

Treatment of the gels produced by the action of polyvalent metal ions, by means of acids and the above-mentioned cross-linking agents in order to exchange the metal ions by hydrogen ions is, of course, also possible.

Instead of using acids and cross-linking agents, the same gel-producing effect is achieved by means of acids the anions of which have a cross-linking effect. Such acids are, for instance, polybasic organic acids such as tartaric acid, malic acid, citric acid, and the like acids. These acids are capable of fixing the ionotropic gel structure for a prolonged period of time. Gel formation is achieved, for instance, by covering the sol with 0.1 N solutions of said acids.

Cross-linking, for instance, with formaldehyde may also be effected before treating the gel with acids in order to exchange the metal ions. For this purpose the gel is kept, for instance, at 4° C. in an 0.01% formaldehyde solution for at least 24 hours whereafter replacement of the metal ions by hydrogen ions is achieved by a treatment with 0.1 N hydrochloric acid without dissolving or destroying the gel.

It is, of course, also possible to treat the gel with polybasic organic acids, for instance, with citric acid solutions whereby not only the metal ions are exchanged by hydrogen ions but also cross-linking takes place.

All gels which are produced by diffusion of polybasic organic acids show capillaries. Treatment of the sol with a mixture of 0.1 N acetic acid and 0.1% formaldehyde solution (1:1) yields an especially strong membrane which is free of capillaries.

Suitable softeners to be added to the sol before gel formation are, for instance, polydiols and polyvinyl-alcohols.

The addition of mucopolysaccharides to the protein sol before gelation is of importance with respect to the formation of the desired ionotropic structure of the gel. Pure protein sols yield only slightly ionotropic gels. But even small amounts of mucopolysaccharides produce pronounced ionotropic effects. Thus, for instance, addition of chondroitin sulfuric acid causes extensive formation of capillaries while hyaluronic acid is more particularly responsible for spatial cross-linking. Addition of these mucopolysaccharides results in strong orientation which is characterized by the birefringence of the gel.

Of course, many changes and variations in the components of the reconstituted tendon, cartilage or nerve sheath material, in the defattening agents, in the solubilizing agents, the gel-forming agents used, in the conditions of dissolving the natural starting material and of forming ionotropic gels therefrom, in the methods of working up the resulting reconstituted tendons, cartilage, of nerve sheath materials and of storing them, and the like may be made by those skilled in the art in accordance with the principles set forth herein and in the claims annexed hereto.

I claim:

1. In a process of producing reconstituted protein tendons, cartilage, and nerve sheaths for the replacement of natural tendons, nerve sheaths, and cartilage in humans and animals, by the steps of
   (a) exposing mucopolysaccharide-containing protein tissue selected from the group consisting of cartilage, tendons, ligaments, and nerve sheaths to swelling solutions having substantially no denaturating effect on proteins,
   (b) removing from said tissue the mucopolysaccharides present therein, and
   (c) converting the swollen tissue into colloidal protein solution, the improvement which consists of the further steps of
   (d) adding a substantially inert foreign mucopolysaccharide to and dissolving it in said colloidal solution in an amount sufficient to cause orientation of the filiform collagen molecules in the ionotropic gel obtained in the following step, and
   (e) allowing gel-forming ions to diffuse into said colloidal solution to produce the reconstituted ionotropic tissue gel, thereby shaping the gel to form the tissue to be reconstructed.

2. The process according to claim 1, wherein the colloidal solution obtained in step (b) is freed of excess dissolving agent and entrained air before gel formation according to step (c).

3. The process according to claim 1, wherein the mucopolysaccharide is an alginate.

4. The process according to claim 1, wherein the swelling solution is a solution containing lithium hydroxide.

5. The process according to claim 1, wherein the swelling solution is a solution containing sodium hydroxide.

6. The process according to claim 1, wherein the resulting gel is cross-linked to improve its strength and stability.

7. The process according to claim 1, wherein the gel-forming ions are polyvalent metal ions selected from the group consisting of copper and cadmium ions.

8. The process according to claim 1, wherein the electrolyte supplying the gel-forming ions is a dilute solution of an organic polybasic acid.

9. The process according to claim 7, wherein the gel-forming metal ions are replaced by hydrogen ions after gel formation is completed.

References Cited

UNITED STATES PATENTS

| 3,114,372 | 12/1963 | Griset et al. | 128—335.5 |
| 3,318,774 | 5/1967 | Dingwall et al. | 424—95 |
| 3,400,199 | 9/1968 | Balassa | 424—95 |
| 3,408,659 | 11/1968 | Thiele et al. | 3—1 |
| 3,469,003 | 9/1969 | Hardy | 424—89 |

SHEP K. ROSE, Primary Examiner

U.S. Cl. X.R.

3—1; 128—1, 335.5